United States Patent [19]
Lee

[11] Patent Number: 5,497,963
[45] Date of Patent: Mar. 12, 1996

[54] INDUCED-DRAFT FAN PIPE MOUNTING DEVICE FOR ELECTRIC SOLDERING IRONS

[76] Inventor: A-Ying Lee, No. 19, Lane, 156, Ling-Yun Rd., Sec. 1, Wu-Ku Village, Taipei Hsien, Taiwan

[21] Appl. No.: 275,752

[22] Filed: Jul. 19, 1994

[51] Int. Cl.⁶ .................................................. F16L 3/00
[52] U.S. Cl. .......................... 248/52; 24/17 A; 24/339; 219/230; 248/314; 248/230.9; 248/176.2
[58] Field of Search ................................ 248/52, 60, 62, 248/74.3, 229, 231, 314, 316.1, 316.7; 24/339, 17 A, 178, 280, 20 LS, 23 W; 219/230

[56] References Cited

U.S. PATENT DOCUMENTS

| | | | |
|---|---|---|---|
| 689,131 | 12/1901 | Schuter | 24/17 A |
| 1,648,220 | 11/1927 | Gerow et al. | 248/231 |
| 1,786,459 | 12/1930 | Simone | 248/229 |
| 2,470,694 | 5/1949 | Foo | 248/231 X |
| 2,502,049 | 3/1950 | Kaminski | 248/231 X |
| 5,182,435 | 1/1993 | Wong | 219/230 |
| 5,333,821 | 8/1994 | Lee | 248/52 |

*Primary Examiner*—Alvin Chin-Shue
*Assistant Examiner*—Korie H. Chan
*Attorney, Agent, or Firm*—Jacobson, Price, Holman & Stern

[57] ABSTRACT

An induced-draft fan pipe mounting device for mounting an induced-draft fan pipe to an electric soldering iron, including a mounting strip mounted around the handle of the electric soldering iron and having a series of through holes along the length, two connecting plates connected together by a screw to hold the mounting strip on the handle of the electric soldering iron, each connecting plate having a first lug at one side inserted through one through hole on the mounting strip and overlapped on a back side of the mounting strip, and two opposite second lugs respectively covered over the back side of the mounting strip; and an induced-draft fan pipe holder having two lugs at one end respectively fastened to either two adjacent through holes on the mounting strip, a holding device at an opposite, which receives the induced-draft fan pipe.

4 Claims, 4 Drawing Sheets

INDUCED-DRAFT FAN PIPE MOUNTING DEVICE FOR ELECTRIC SOLDERING IRONS

BACKGROUND OF THE INVENTION

The present invention relates to an induced-draft fan pipe mounting device which can be conveniently adjusted to fit any of a variety of electric soldering irons.

FIG. 7 shows an electric soldering iron with an induced-draft fan pipe, which was filed on Jun. 9, 1993 by the inventor of the present invention under U.S. patent application No. 08/073,483. This structure of electric soldering iron comprises a body 7 having a pipe holder 721 fastened to the soldering bit 73 thereof by a mounting device 72 to hold an induced-draft fan pipe 71 for carrying away toxic gas during the process of soldering. Because the pipe holder and the mounting device are specially designed to fit the electric soldering iron, they do not fit all conventional electric soldering irons and, their manufacturing cost is high.

FIG. 8 shows another structure of electric soldering iron having a mounting device 82 fixedly mounted around the handle 8 thereof near the soldering bit 83 to hold an induced-draft fan pipe 81 for carrying away toxic gas during the process of soldering. Because the mounting device 82 has a fixed inner diameter, it fits the handle of an electric soldering iron of a predetermined size. Therefore, this structure of induced-draft fan pipe mounting device does not fit all conventional electric soldering irons.

SUMMARY OF THE INVENTION

The present invention has been accomplished under the circumstances in view. It is therefore one object of the present invention to provide an induced-draft fan pipe mounting device for electric soldering irons which can be adjusted for mounting an induced-draft fan pipe on any of a variety of soldering irons. It is another object of the present invention to provide an induced-draft fan pipe mounting device for electric soldering irons which can be adjusted to hold any of a variety of induced-draft fan pipes on an electric soldering iron. It is still another object of the present invention to provide an induced-draft fan pipe mounting device for electric soldering irons which is detachable and can be conveniently assembled and installed without through the process of welding.

To achieve the aforesaid objects, there is provided an induced-draft fan pipe mounting device for mounting an induced-draft fan pipe to an electric soldering iron, the device comprising a mounting strip mounted around the handle of the electric soldering iron and having a series of through holes along the length, two connecting plates connected together by a screw to hold the mounting strip on the handle of the electric soldering iron, each connecting plate having a first lug at one side inserted through one through hole on the mounting strip and overlapped on a back side of the mounting strip, and two opposite second lugs respectively covered over the back side of the mounting strip; and an induced-draft fan pipe holder having two lugs at one end of a flat frame thereof respectively fastened to either two adjacent through holes on the mounting strip, a at an opposite of the flat frame, which receives the induced-draft fan pipe. By bending the flat frame of the induced-draft fan pipe holder in the desired direction, the angular position of the induced-draft fan pipe is adjusted relative to the soldering tip of the electric soldering iron.

DETAILED DESCRIPTION OF THE PREFERRED EMBODIMENT

Figure 1:
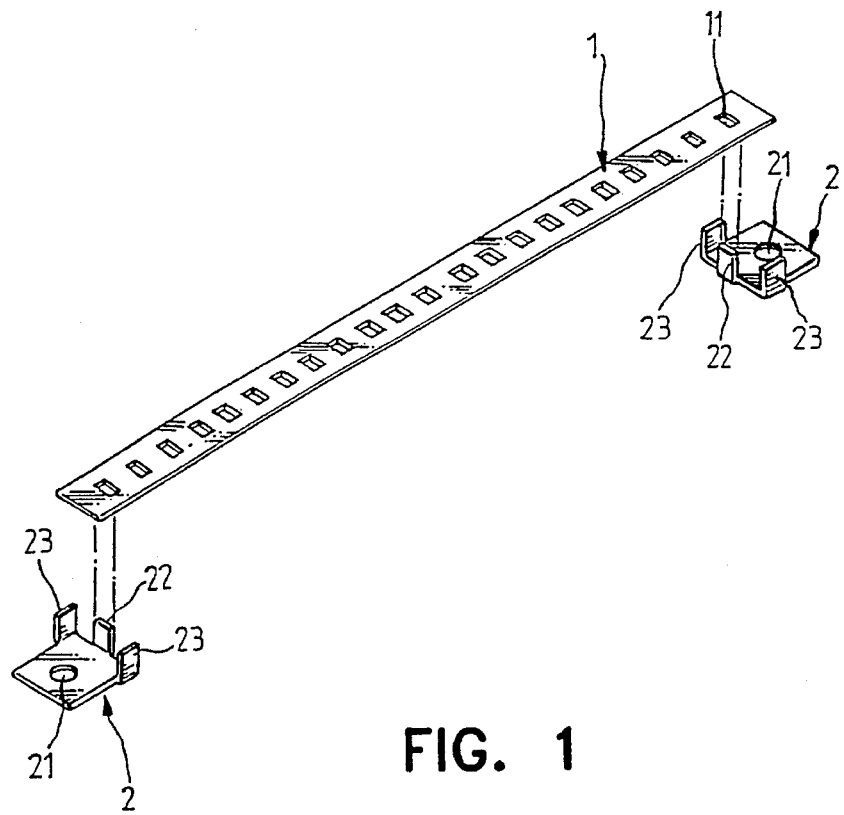
FIG. 1 is a dismantled view of the mounting strip and the connecting plates for an induced-draft fan pipe mounting device according to the present invention.
Figure 2:
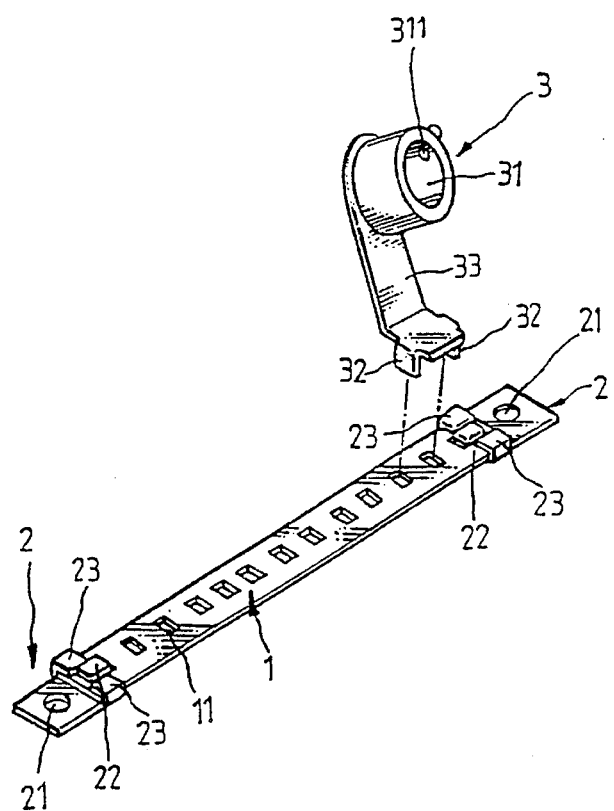
FIG. 2 is a dismantled view of the induced-draft fan pipe holder and the mounting strip according to the present invention.

Referring to FIGS. 1 and 2, the present invention is generally comprised of a mounting strip 1, two connecting plates 2, and an induced-draft fan pipe holder 3.

Referring to FIGS. 1 and 2 again, the mounting strip 1 is a long, narrow, flat piece of flexible, heat-resisting material having a series of through holes 11 arranged along the length for mounting the connecting plates 2 and the induced-draft fan pipe holder 3. The connecting plate 2 has a screw hole 21, a first lug 22 at one side inserted through either through hole 11 on the mounting strip 1 and then bent inward, two opposite second lugs 23 respectively bent inwards and covered over two opposite sides of the mounting strip 1. The induced-draft fan pipe holder 3 comprises a flat frame 33 having a sleeve 31 at one end and two lugs 32 at an opposite end. The sleeve 31 has a screw hole 311 through the sleeve wall for mounting a tightening up screw. The induced-draft fan pipe holder 3 can be conveniently fastened to the mounting strip 1 by inserting the two lugs 32 of the induced-draft fan pipe holder 3 into either two adjacent through holes 11 on the mounting strip 1 and then bending the lugs inwards toward each other. When the induced-draft fan pipe holder 3 is fastened to the mounting strip 1, the angular position of the sleeve 31 can be adjusted relative to the mounting strip 1 by bending the flat frame 33 in the desired direction.

Figure 3:
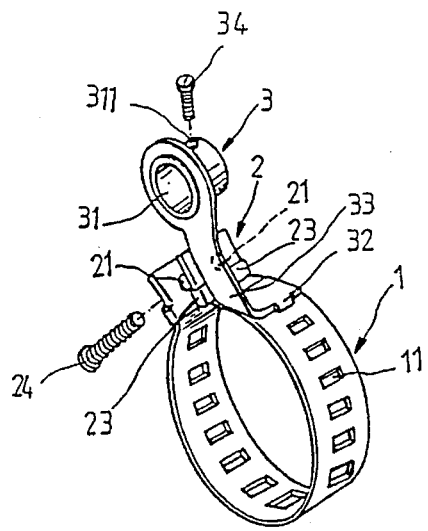
FIG. 3 is an assembly view of the induced-draft fan pipe mounting device of the present invention.
Figure 4:
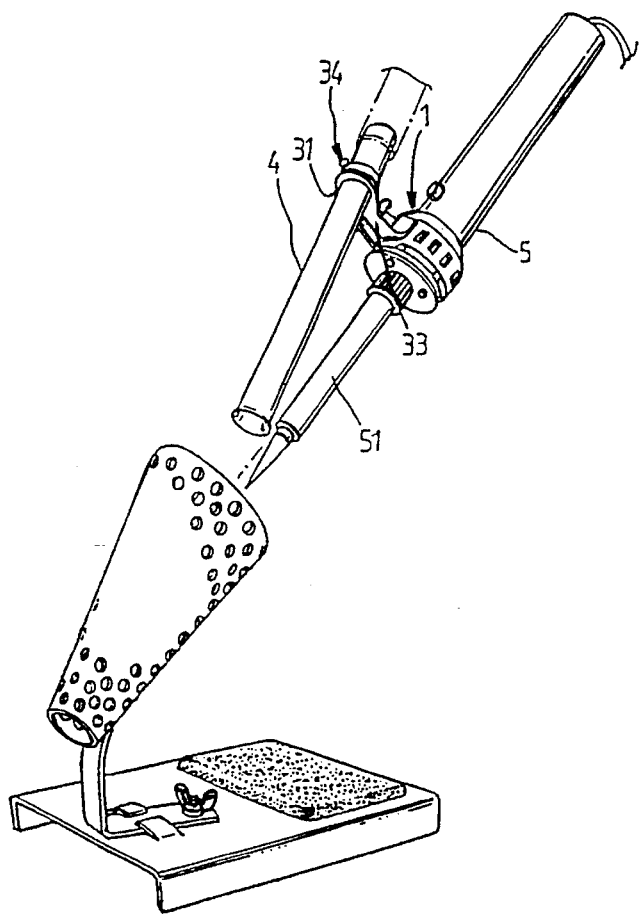
FIG. 4 is an installed view showing the induced-draft fan pipe mounting device of the present invention mounted on the handle of an electric soldering iron to hold an induced-draft fan pipe.

Referring to FIGS. 3 and 4 after the two connecting plates 2 have been respectively fastened to the two opposite ends of the mounting strip 1 and the induced-draft fan pipe holder 3 has been fastened to the mounting strip 1 at a suitable location, the mounting strip 1 is mounted around the handle 5 of an electric soldering iron and then fixed in place by connecting the screw holes 21 of the connecting plates 2 together by a screw 24. and then the induced draft fan pipe 4 is inserted through the sleeve 31 of the induced-draft fan pipe holder 3 and tightened up by threading a tightening up screw 34 into the screw hole 311 on the sleeve 31, By bending the flat frame 33 of the induced-draft fan pipe holder 3, the angular position of the induced-draft fan pipe 4 is adjusted relative to the soldering tip 51 of the electric soldering iron.

Figures 5, 6:
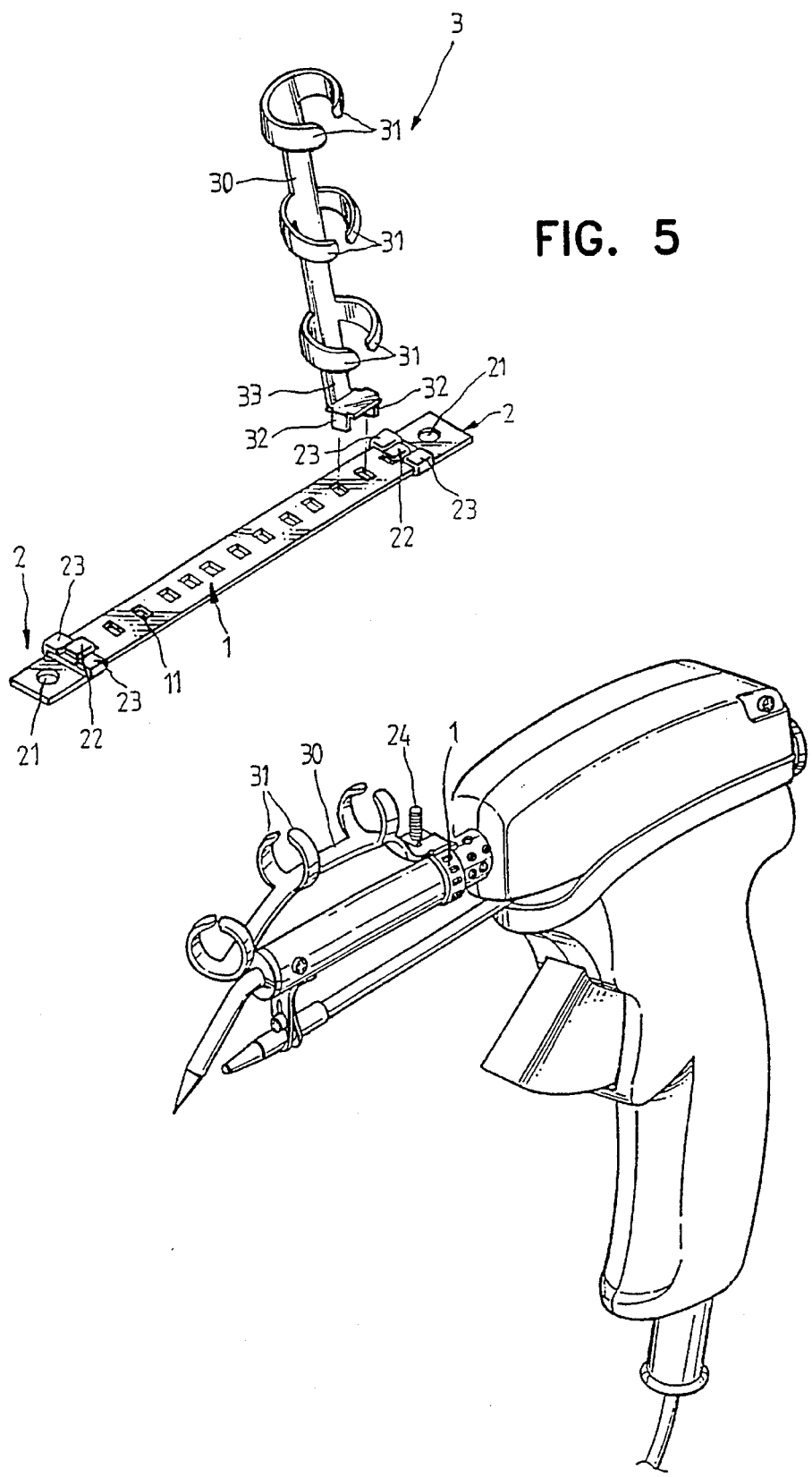
FIG. 5 is a dismantled view of the induced-draft fan pipe holder and the mounting strip according to an alternate form of the present invention.
FIG. 6 is another installed view of the present invention, showing an alternate form of the induced-draft fan pipe holder.
Figure 7:
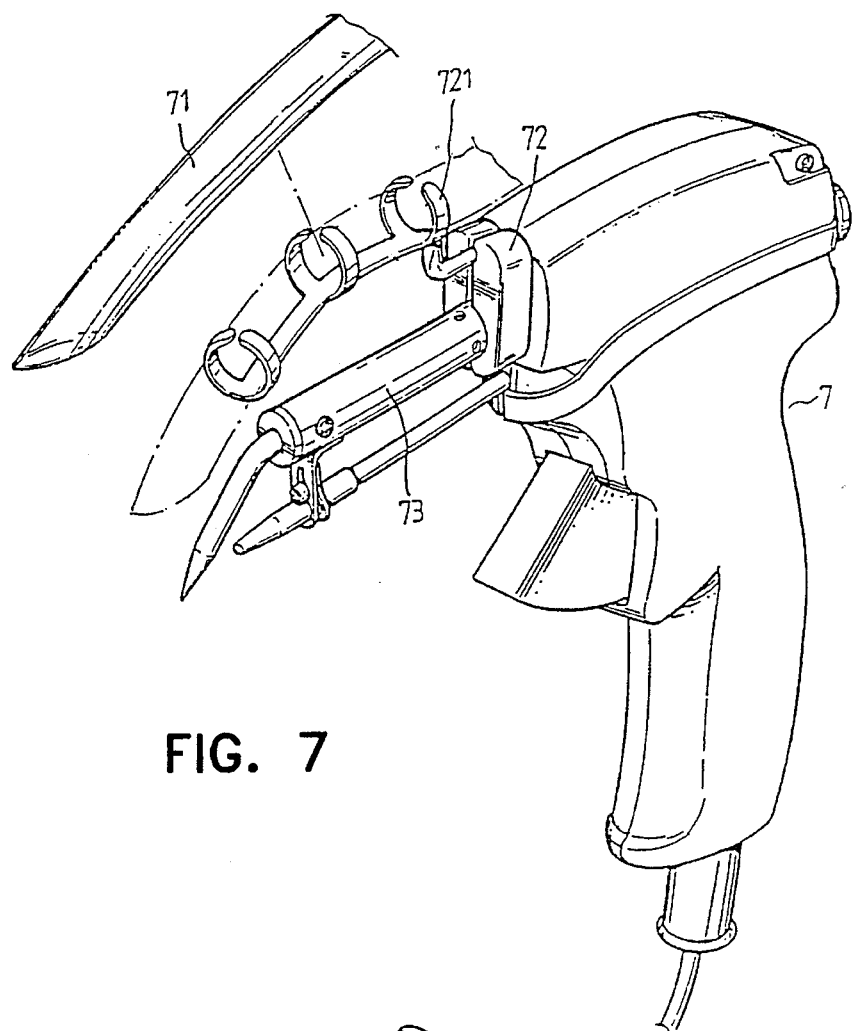
FIG. 7 shows an induced-draft fan pipe mounting device mounted on an electric soldering iron to hold an induced-draft fan pipe according to the prior art.
Figure 8:
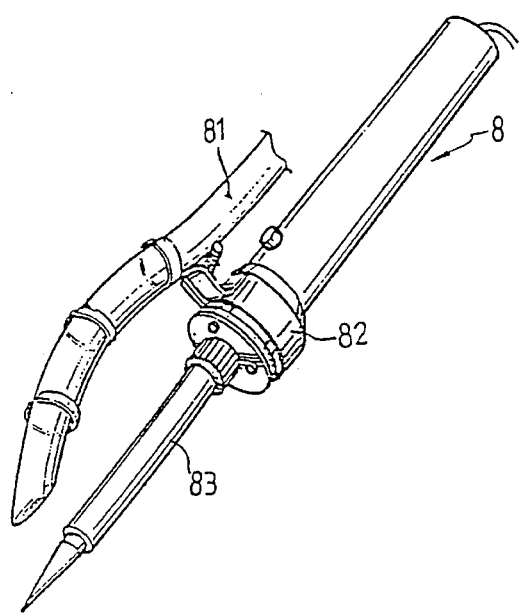
FIG. 8 shows another structure of induced-draft fan pipe mounting device mounted on an electric soldering iron to hold an induced-draft fan pipe according to the prior art.

Referring to FIG. 5 and 6 therein illustrated shows an alternate form of the induced-draft fan pipe holder suitable for holding a flexible induced-draft fan pipe. This structure of induced-draft fan pipe holder 3 comprises a flat frame 33 having a longitudinal holder body 30 and pairs of symmetrical ribs 31 at one end and two lugs 32 at an opposite end. Pairs of symmetrical ribs 31 are bilaterally and perpendicularly extended from the holder body 30 and are spaced longitudinally along the body 30.

The induced-draft fan pipe holder 3 can be conveniently fastened to the mounting strip 1 by inserting the two lugs 32 of the induced-draft fan pipe holder 3 into either two adjacent through holes 11 on the mounting strip 1 and then bending the lugs inwards toward each other. When the induced-draft fan pipe holder 3 is fastened to the mounting strip 1, pairs of symmetrical ribs 31 are bent into respective open-end loops for holding the induced-draft fan pipe.

What is claimed is:

1. The combination of an induced-draft fan pipe mounting device, an induce drafted fan pipe, and an electric soldering iron; the mounting device comprising:

a flat, narrow, elongated mounting strip mounted around a handle of said electric soldering iron and having a series of through holes aligned along the length;

two connecting plates respectively connected together to hold said mounting strip on said handle, each connecting plate comprising a screw hole, into which a screw is threaded to fasten said connecting plates together, a first lug at one side inserted through one of said through holes at one end of said mounting strip and overlapped on a back side of said mounting strip, and two opposite second lugs respectively covered over the back side of said mounting strip; and an induced-draft fan pipe holder fastened to said mounting strip to hold said induced-draft fan pipe, said induced-draft fan pipe holder comprising a flat frame having a holding means at one end, which receives the induced-draft fan pipe, and two lugs at an opposite end respectively inserted through two of said adjacent through holes on said mounting strip and covered over the back side of said mounting strip.

2. The induced-draft fan pipe mounting device of claim 1 wherein said holding means is a sleeve.

3. The induced-draft fan pipe mounting device of claim 1 wherein said holding means comprises a longitudinal holder body and pairs of symmetrical ribs bilaterally and perpendicularly extended from said body, said pairs of symmetrical ribs being spaced longitudinally along said body and being bent into respective open-end loops for holding said induced-draft fan pipe.

4. The induced-draft fan pipe mounting device of claim 2 wherein said sleeve has a screw hole into which a tightening up screw is threaded to hold down said induced-draft fan pipe.

* * * * *